United States Patent
Li

(10) Patent No.: US 10,819,592 B2
(45) Date of Patent: Oct. 27, 2020

(54) SLICE INSTANCE MANAGEMENT METHOD AND APPARATUS

(71) Applicant: HUAWEI TECHNOLOGIES CO., LTD., Shenzhen, Guangdong (CN)

(72) Inventor: Zhuoming Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 16/385,419

(22) Filed: Apr. 16, 2019

(65) Prior Publication Data

US 2019/0245758 A1 Aug. 8, 2019

Related U.S. Application Data

(63) Continuation of application No. PCT/CN2017/104408, filed on Sep. 29, 2017.

(30) Foreign Application Priority Data

Oct. 18, 2016 (CN) .......................... 2016 1 0908985

(51) Int. Cl.
*H04L 29/08* (2006.01)
*H04L 12/24* (2006.01)
(Continued)

(52) U.S. Cl.
CPC ...... *H04L 41/5077* (2013.01); *G06F 9/45558* (2013.01); *H04L 41/0806* (2013.01);
(Continued)

(58) Field of Classification Search
None
See application file for complete search history.

(56) References Cited

U.S. PATENT DOCUMENTS

2013/0311623 A1 11/2013 Kanada et al.
2014/0086177 A1 3/2014 Adjakple et al.
(Continued)

FOREIGN PATENT DOCUMENTS

CN 103905523 A 7/2014
CN 104363159 A 2/2015
(Continued)

OTHER PUBLICATIONS

International Search Report dated Dec. 28, 2017 in corresponding International Application No. PCT/CN2017/104408.

*Primary Examiner* — Adnan M Mirza
(74) *Attorney, Agent, or Firm* — Slater Matsil, LLP

(57) ABSTRACT

Embodiments of the present application provide a slice instance management method and apparatus. The method includes: receiving, by a slice instance management node, a first service request from an operator system, where the first service request includes information about a management operation to be performed by the operator system on a first network element, and the first network element is a network element in a slice instance managed by the slice instance management node; and if the first service request is within first management rights, sending the information about the management operation to be performed by the operator system on the first network element to the first network element, where the first management rights are management rights of the operator system for the slice instance that are included in a description file of the instance management node.

20 Claims, 6 Drawing Sheets

(51) Int. Cl.
*H04W 24/02* (2009.01)
*G06F 9/455* (2018.01)
*H04L 12/911* (2013.01)

(52) U.S. Cl.
CPC ......... *H04L 41/5041* (2013.01); *H04W 24/02* (2013.01); *G06F 2009/45595* (2013.01); *H04L 47/78* (2013.01)

(56) References Cited

U.S. PATENT DOCUMENTS

| | | |
|---|---|---|
| 2015/0063166 A1 | 5/2015 | Sif et al. |
| 2015/0263891 A1 | 9/2015 | Baugher et al. |
| 2015/0358399 A1 | 12/2015 | Baugher et al. |
| 2017/0208019 A1* | 7/2017 | Shimojou ............ H04L 41/0896 |
| 2017/0367036 A1* | 12/2017 | Chen ....................... H04L 43/08 |

FOREIGN PATENT DOCUMENTS

| | | |
|---|---|---|
| CN | 105634782 A | 6/2016 |
| CN | 105900518 A | 8/2016 |
| KR | 20130047489 A | 5/2013 |

* cited by examiner

Slice instance management system 100

Slice instance management system 100

SLICE INSTANCE MANAGEMENT METHOD AND APPARATUS

CROSS-REFERENCE TO RELATED APPLICATIONS

This application is a continuation of International Application No. PCT/CN2017/104408, filed on Sep. 29, 2017, which claims priority to Chinese Patent Application No. 201610908985.7, filed on Oct. 18, 2016, The disclosures of the aforementioned applications are hereby incorporated by reference in their entireties.

TECHNICAL FIELD

The present application relates to the field of communications technologies, and in particular, to a slice instance management method and apparatus.

BACKGROUND

A network slice (Network Slice) is an end-to-end logical network. A network slice includes client dedicated or shared network functions and network connection relationships between these network functions.

Currently, a network slice management system is shown in FIG. 1. A slice management node 11 may call a virtualization management and orchestration node 12 to perform an instantiation operation on a customized network slice, so as to obtain different network slice instances 13 (simply referred to as slice instances). Afterwards, an operator 14 and a client 15 both may send, to the slice management node 11, a service request used to manage a slice instance 13, and the service request may carry an identifier of the corresponding slice instance. Then, the slice management node 11 may manage network function entities in the corresponding slice instance 13 according to the service request.

However, the operator 14 and the client 15 usually have different management rights for the slice instance 13. Therefore, complex control logic needs to be set in the slice management node 11, to determine whether a service request delivered by the operator 14 or the client 15 for the slice instance 13 is appropriate, so as to ensure logical isolation between operations on different slice instances 13. For example, both a slice instance A and a slice instance B use a same network function entity 1 to implement different service functions; and when the operator 14 requires to modify a running parameter of the network function entity 1 in the slice instance A, the slice instance B may be affected and cannot continue to use the network function entity 1 to implement a corresponding service function. Therefore, corresponding control logic needs to be preset in the slice management node 11, so that when receiving the service request sent by the operator 14 or the client 15, the slice management node 11 can determine in a timely manner whether the service request is appropriate. This undoubtedly increases implementation complexity of the slice management node 11 and increases load of the slice management node 11.

SUMMARY

Embodiments of the present application provide a slice instance management method and apparatus, so as to reduce complexity of slice instance management and reduce load of a slice management node.

To achieve the foregoing objective, the following technical solutions are used in the embodiments of the present application:

According to a first aspect, an embodiment of the present application provides a slice instance management method, including: receiving, by a slice instance management node, a first service request from an operator system, where the first service request includes information about a management operation to be performed by the operator system on a first network element, and the first network element is a network element in a slice instance managed by the slice instance management node; and if the first service request is within first management rights, sending, by the instance management node, the information about the management operation to be performed by the operator system on the first network element to the first network element, where the first management rights are management rights of the operator system for the slice instance that are included in a description file of the instance management node. In other words, according to the slice instance management method provided in this embodiment of the present application, the slice instance management node is introduced to manage the slice instance in place of a conventional slice management node. The first management rights of the operator system for the slice instance are configured in the slice instance management node in a process of instantiating the slice instance management node. Therefore, various management operations can be performed on each network element in the slice instance directly according to the configured first management rights during actual running of the slice instance, without a need to additionally set complex control logic to determine whether the service request delivered by the operator system is appropriate. This ensures isolation between different slice instances, and also reduces management complexity and load consumption in a slice instance management process.

In a possible design manner, the method further includes: receiving, by the slice instance management node, a second service request from a client system, where the second service request includes information about a management operation to be performed by the client system on the first network element; and if the second service request is within second management rights, sending, by the instance management node, the information about the management operation to be performed by the client system on the first network element to the first network element, where the second management rights are management rights of the client system for the slice instance that are included in the description file. The second management rights of the client system for the slice instance are configured in the slice instance management node in the process of instantiating the slice instance management node. Therefore, various management operations can be performed on each network element in the slice instance directly according to the configured second management rights during actual running of the slice instance, without a need to additionally set complex control logic to determine whether the service request delivered by the client system is appropriate. This further reduces management complexity and load consumption in the slice instance management process.

In a possible design manner, the method further includes: obtaining, by the slice instance management node, running information of the first network element according to third management rights, where the third management rights are included in the description file and are used to allow the slice instance management node to obtain running information required by the operator system and running information required by the client system; and sending, by the slice instance management node to the operator system according to fourth management rights, the running information required by the operator system in the running information, where the fourth management rights are included in the description file and are used to allow the slice instance management node to report the running information to the operator system. In other words, during instantiation of the slice instance management node, running information of a network element that can be obtained by the slice instance management node may be predefined in the description file, and the running information includes the running information required by the operator system and the running information required by the client system. Therefore, after the slice instance management node is instantiated based on the description file, the slice instance management node has the third management rights to obtain the foregoing running information and the fourth management rights to send the running information required by the operator system to the operator system, and then, at a running stage of the slice instance, the slice instance management node may directly obtain related running information of the first network element in the slice instance, and send the running information required by the operator system in the running information to the operator system.

In a possible design manner, after the obtaining, by the slice instance management node, running information of the first network element according to third management rights, the method further includes: sending, by the slice instance management node to the client system according to fifth management rights, the running information required by the client system in the running information, where the fifth management rights are included in the description file and are used to allow the slice instance management node to report the running information to the client system. Similarly, after the slice instance management node is instantiated based on the description file, the slice instance management node has the fifth management rights to send the running information required by the client system to the client system, and then, at the running stage of the slice instance, the slice instance management node may directly send the running information required by the client system in the running information to the client system.

In a possible design manner, before the receiving, by a slice instance management node, a first service request from an operator system, the method further includes: obtaining, by a virtualization management and orchestration node, the description file of the slice instance management node, where the description file includes a software mirror of the slice instance management node and a connection relationship between the slice instance management node and N network elements in the slice instance, and N≥1; deploying, by the virtualization management and orchestration node, the slice instance management node based on the software mirror; and establishing, by the virtualization management and orchestration node, a management channel between the slice instance management node and the N network elements based on the connection relationship. In contrast to the prior art in which a slice management node needs to be deployed manually and a management policy in the slice management node needs to be configured, so as to implement management on each slice instance, in this embodiment of the present application, in a process of instantiating each slice instance, the slice instance management node managing the slice instance can be automatically deployed based on a corresponding description file, and then, the slice instance management node can automatically manage the slice instance belonging to the slice instance management node, according to management rights configured in the instantiation process. This implements an automatic slice instance management process and significantly reduces management costs and operation costs during slice instance management.

In a possible design manner, the description file further includes northbound interface information and southbound interface information; the northbound interface information includes an interface connected to the operator system and an interface connected to the client system, and the management rights of the operator system for the slice instance and the management rights of the client system for the slice instance; and the southbound interface information includes an interface connected to each network element in the slice instance, where after the establishing, by the virtualization management and orchestration node, a management channel between the slice instance management node and the network elements in the slice instance based on the connection relationship, the method further includes: configuring, by the virtualization management and orchestration node, a southbound interface and a northbound interface for the slice instance management node based on the southbound interface information and the northbound interface information.

In a possible design manner, the slice instance management node is deployed in the slice instance; or the slice instance management node is deployed in the operator system; or the slice instance management node is deployed outside the slice instance and the operator system.

According to a second aspect, an embodiment of the present application provides a method for instantiating a slice instance management node, including: obtaining, by a virtualization management and orchestration node, a description file of a slice instance management node, where the description file includes a software mirror of the slice instance management node and a connection relationship between the slice instance management node and N network elements, where the N network elements are network elements that are in a slice instance and that are managed by the slice instance management node, and N≥1; deploying, by the virtualization management and orchestration node, the slice instance management node based on the software mirror; and establishing, by the virtualization management and orchestration node, a management channel between the slice instance management node and the N network elements based on the connection relationship.

In a possible design manner, the description file further includes northbound interface information and southbound interface information; the northbound interface information includes an interface connected to an operator system and an interface connected to a client system, and management rights of the operator system for the slice instance and management rights of the client system for the slice instance; and the southbound interface information includes an interface connected to each network element in the slice instance, where after the establishing, by the virtualization management and orchestration node, a management channel between the slice instance management node and the N network elements based on the connection relationship, the method further includes: configuring, by the virtualization management and orchestration node, a southbound interface and a northbound interface for the slice instance management node based on the southbound interface information and the northbound interface information.

According to a third aspect, an embodiment of the present application provides a slice instance management node, where the slice instance management node has functions of implementing actions of the slice instance management node in the foregoing method designs. The functions may be implemented by hardware, or may be implemented by executing corresponding software by hardware. The hardware or software includes one or more modules that correspond to the foregoing functions.

According to a fourth aspect, an embodiment of the present application provides a virtualization management and orchestration node, where the virtualization management and orchestration node has functions of implementing actions of the virtualization management and orchestration node in the foregoing method designs. The functions may be implemented by hardware, or may be implemented by executing corresponding software by hardware. The hardware or software includes one or more modules that correspond to the foregoing functions.

According to a fifth aspect, an embodiment of the present application provides a slice instance management node, including a processor, a memory, a bus, and a commutations interface, where the memory is configured to store a computer executable instruction; the processor is connected to the memory by using the bus; and when the slice instance management node runs, the processor executes the computer executable instruction stored in the memory, so that the slice instance management node performs the slice instance management method according to any possible design manner in the first aspect.

According to a sixth aspect, an embodiment of the present application provides a virtualization management and orchestration node, including a processor, a memory, a bus, and a commutations interface, where the memory is configured to store a computer executable instruction; the processor is connected to the memory by using the bus; and when the virtualization management and orchestration node runs, the processor executes the computer executable instruction stored in the memory, so that the virtualization management and orchestration node performs the method for instantiating a slice instance management node according to any possible design manner in the second aspect.

According to a seventh aspect, an embodiment of the present application provides a slice instance management system, including a slice instance management node and a virtualization management and orchestration node. The virtualization management and orchestration node is configured to: obtain a description file of the slice instance management node, where the description file includes a software mirror of the slice instance management node and a connection relationship between the slice instance management node and N network elements, where the N network elements are network elements that are in a slice instance and that are managed by the slice instance management node, and N≥1; deploy the slice instance management node based on the software mirror; and establish a management channel between the slice instance management node and the N network elements based on the connection relationship. The slice instance management node is configured to: receive a first service request from an operator system, where the first service request includes information about a management operation to be performed by the operator system on a first network element, and the first network element is a network element in a slice instance managed by the slice instance management node; and if the first service request is within first management rights, send the information about the management operation to be performed by the operator system on the first network element to the first network element, where the first management rights are management rights of the operator system for the slice instance that are included in the description file of the instance management node.

According to an eighth aspect, an embodiment of the present application provides a computer storage medium, configured to store a computer software instruction for use by the foregoing slice instance management node, where the computer software instruction includes a program designed for the slice instance management node to execute the foregoing aspects.

According to a ninth aspect, an embodiment of the present application provides a computer storage medium, configured to store a computer software instruction for use by the foregoing virtualization management and orchestration node, where the computer software instruction includes a program designed for the virtualization management and orchestration node to execute the foregoing aspects.

In addition, for technical effects brought by any design manner in the second to the ninth aspects, reference may be made to technical effects brought by different design manners in the first aspect. Details are not described herein again.

These or other aspects of the present application are more concise and comprehensible in descriptions of the following embodiments.

BRIEF DESCRIPTION OF DRAWINGS

To describe the technical solutions in the embodiments of the present application or in the prior art more clearly, the following briefly describes the accompanying drawings required for describing the embodiments or the prior art.

DESCRIPTION OF EMBODIMENTS

Figure 1:
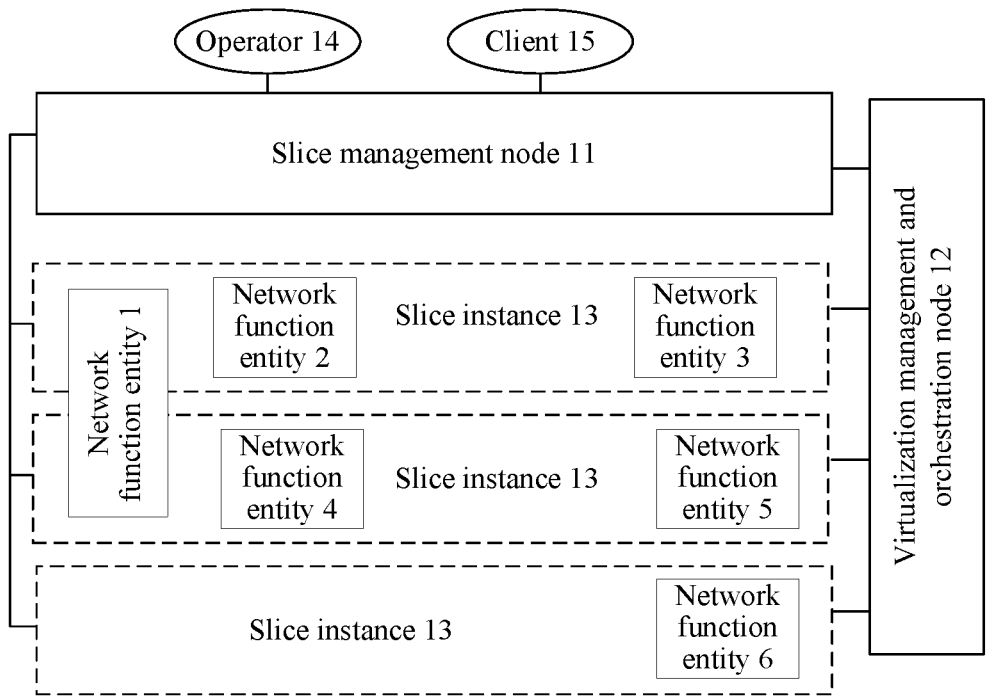
FIG. 1 is a schematic diagram of an architecture of a network slice management system in the prior art.

The following describes the technical solutions in the embodiments of the present application with reference to the accompanying drawings in the embodiments of the present application. Apparently, the described embodiments are merely some rather than all of the embodiments of the present application.

In addition, the terms "first" and "second" are merely intended for a purpose of description, and shall not be understood as an indication or implication of relative importance or an implicit indication of a quantity of indicated technical features. Therefore, a feature qualified by "first" or "second" may explicitly or implicitly include one or more features. In the descriptions of the present application, unless otherwise specified, "a plurality of" means two or more.

An embodiment of the present application provides a slice instance management method. The method may be applied to a slice instance management system 100 shown in FIG. 2. The slice instance management system 100 includes a virtualization management and orchestration node 25 and a slice instance management node 21 that can communicate with each other. The slice instance management node 21 may be deployed in any slice instance. The slice instance management node 21 may communicate with an operator system 22 and a client system 23.

Specifically, while instantiating the slice instance, the virtualization management and orchestration node 25 may deploy the slice instance management node 21 in the slice instance as a network element having a function of managing the slice instance, and establish a management channel between the slice instance management node 21 and each network element 24 in the slice instance, an interface between the slice instance management node 21 and the operator system 22 and management rights of the operator system 22 for the slice instance management node 21, and an interface between the slice instance management node 21 and the client system 23 and management rights of the client system 23 for the slice instance management node 21. In other words, while instantiating the slice instance, the virtualization management and orchestration node 25 performs an instantiation operation on the slice instance management node 21.

In this case, during actual running of the slice instance, when sending a corresponding service request to the network element 24 in the slice instance for managing the slice instance, the operator system 22 first needs to send the service request to the slice instance management node 21 through the interface between the operator system 22 and the slice instance management node 21, and then, the slice instance management node 21 performs authentication on the service request, and may perform a corresponding management operation according to the service request if the service request is within the management rights deployed for the operator system 22 during instantiation of the instance management node 21, or may directly ignore the service request if the service request is not within the management rights.

Similarly, when sending a corresponding service request to the network element 24 in the slice instance for managing the slice instance, the client system 23 first needs to send the service request to the slice instance management node 21 through the interface between the client system 23 and the slice instance management node 21, and then, the slice instance management node 21 performs authentication on the service request, and may perform a corresponding management operation according to the service request if the service request is within the management rights deployed for the client system 23 during instantiation of the instance management node 21, or may directly ignore the service request if the service request is not within the management rights.

It can be learned that according to the slice instance management method provided in this embodiment of the present application, the slice instance management node 21 is introduced to manage the slice instance in place of a conventional slice management node. The management rights of the operator system 22 for the slice instance and the management rights of the client system 23 for the slice instance are configured in the slice instance management node 21 in a process of instantiating the slice instance management node 21. Therefore, various management operations can be performed on each network element in the slice instance directly according to the configured management rights during actual running of the slice instance, without a need to additionally set complex control logic to determine whether the service request delivered by the operator system 22 or the client system 23 is appropriate. This ensures isolation between different slice instances, and also reduces management complexity and load consumption in a slice instance management process.

Further, the slice instance management node 21 may have functions such as collecting statistics about and reporting running information during running of the slice instance. Details are described in the following embodiments and not described herein.

Figure 3:
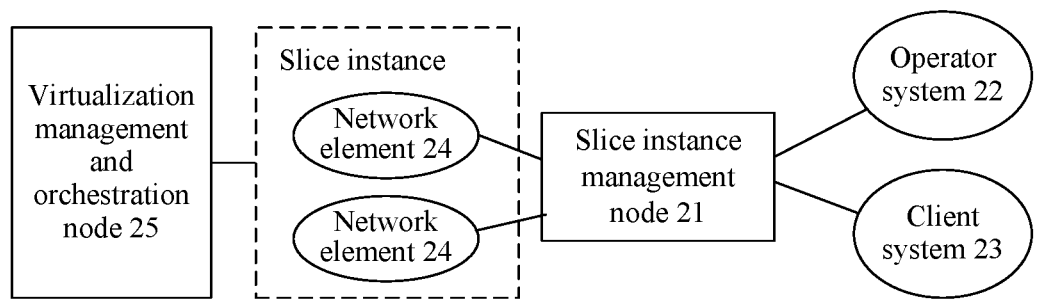
FIG. 3 is a schematic diagram 2 of an architecture of a slice instance management system according to an embodiment of the present application.
Figure 4:
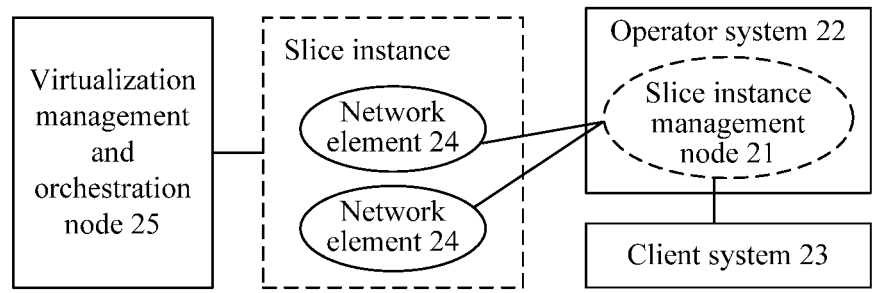
FIG. 4 is a schematic diagram 3 of an architecture of a slice instance management system according to an embodiment of the present application.

In addition, in another possible design scheme of the slice instance management system 100 provided in this embodiment of the present application, the slice instance management node 21 may be deployed in any position outside the slice instance. For example, as shown in FIG. 3, the slice instance management node 21 may be deployed outside the slice instance in a form of an independent device; or as shown in FIG. 4, the slice instance management node 21 may be integrated into the operator system 22 or the client system 23 as a functional unit. This is not limited in this embodiment of the present application.

It should be noted that in embodiments of the present application, any one function node or network element in the slice instance management system 100, such as the slice instance management node 21, the virtualization management and orchestration node 25, and the network element 24, may be implemented by one entity device or may be jointly implemented by a plurality of entity devices. A plurality of function nodes in the slice instance management system 100 may be implemented by different entity devices or may be implemented by a same entity device. It can be understood that any one function node in the slice instance management system 100 may be a logical function module in an entity device or may be a logical function module including a plurality of entity devices.

Figure 2:
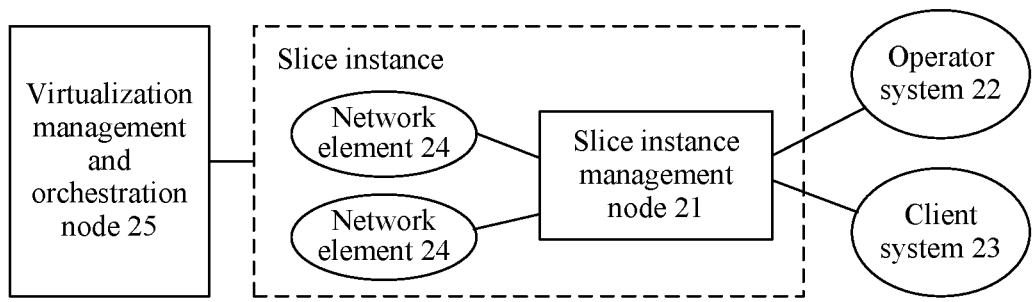
FIG. 2 is a schematic diagram 1 of an architecture of a slice instance management system according to an embodiment of the present application.
Figure 5:
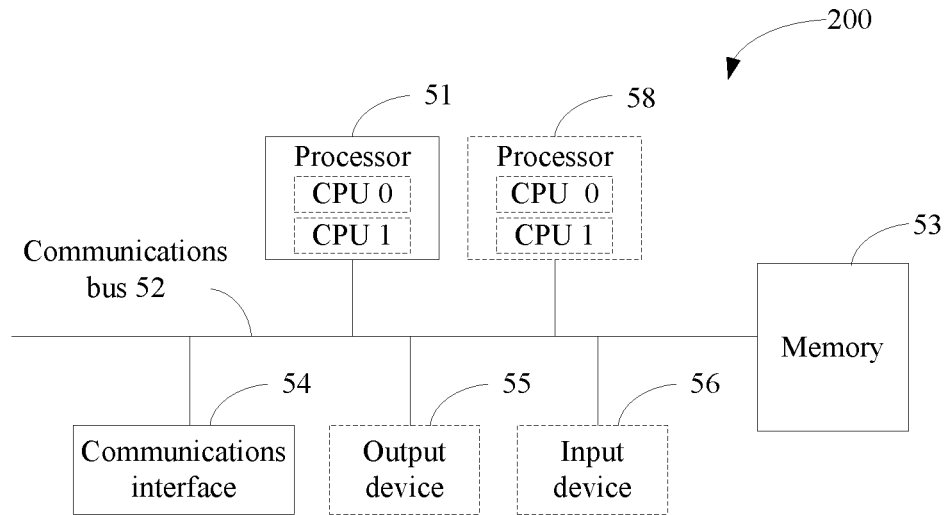
FIG. 5 is a schematic structural diagram of a computer device according to an embodiment of the present application.

As shown in FIG. 5, the virtualization management and orchestration node 25 and the slice instance management node 21 in FIG. 2 to FIG. 4 may be implemented in a form of a computer device (or system) in FIG. 5.

FIG. 5 is a schematic diagram of a computer device according to an embodiment of the present application. The computer device 200 includes at least one processor 51, a communications bus 52, a memory 53, and at least one communications interface 54.

The processor 51 may be a general-purpose central processing unit (CPU), a microprocessor, an application-specific integrated circuit (ASIC), or one or more integrated circuits for controlling execution of a solution program of the present application.

The communications bus 52 may include a path for transferring information between the foregoing components. The communications interface 54 uses any apparatuses like a transceiver to communicate with another device or a communications network, such as an Ethernet network, a radio access network (RAN), or a wireless local area network (WLAN).

The memory 53 may be but is not limited to a read-only memory (ROM) or another type of static storage device that may store static information and instructions, or a random access memory (RAM) or another type of dynamic storage device that may store information and instructions, or may be an electrically erasable programmable read-only memory (EEPROM), a compact disc read-only memory (CD-ROM) or another optical disc storage, an optical disc storage (including a compact disc, a laser disc, an optical disc, a digital versatile disc, a Blu-ray disc, or the like), a magnetic disk storage medium or another magnetic storage device, or any other media that can be used to carry or store expected program code in a form of an instruction or a data structure and that can be accessed by a computer. The memory may exist independently, and is connected to the processor by using the bus. The memory may alternatively be integrated with the processor.

The memory 53 is configured to store application program code for executing the solutions of the present application, and the processor 51 controls the execution. The processor 51 is configured to execute the application program code stored in the memory 53.

During specific implementation, in an embodiment, the processor 51 may include one or more CPUs, for example, a CPU 0 and a CPU 1 in FIG. 5.

During specific implementation, in an embodiment, the computer device 200 may include a plurality of processors, for example, the processor 51 and a processor 58 in FIG. 5. Each of the processors may be a single-core (single-CPU) processor, or may be a multi-core (multi-CPU) processor. The processor herein may be one or more devices, circuits, and/or processing cores for processing data (for example, computer program instructions).

During specific implementation, in an embodiment, the computer device 200 may further include an output device 55 and an input device 56. The output device 55 communicates with the processor 51, and may display information in a plurality of manners. For example, the output device 55 may be a liquid crystal display (LCD), a light emitting diode (LED) display device, a cathode ray tube (CRT) display device, or a projector (projector). The input device 56 communicates with the processor 51, and may receive a user input in a plurality of manners. For example, the input device 56 may be a mouse, a keyboard, a touchscreen device, or a sensor device.

The computer device 200 may be a general-purpose computer device or a special-purpose computer device. During specific implementation, the computer device 200 may be a desktop computer, a portable computer, a network server, a personal digital assistant (PDA), a mobile phone, a tablet computer, a wireless terminal device, a communications device, an embedded device, or a device with a structure similar to that in FIG. 5. A type of the computer device 200 is not limited in this embodiment of the present application.

For example, the virtualization management and orchestration node 25 in FIG. 2 to FIG. 4 may be the device shown in FIG. 5, and a memory of the virtualization management and orchestration node 25 stores one or more software modules. The virtualization management and orchestration node 25 may implement the software module by using a processor and program code in the memory, to implement an instantiation process of the slice instance management node 21.

Alternatively, the slice instance management node 21 in FIG. 2 to FIG. 4 may be the device shown in FIG. 5, and a memory of the slice instance management node 21 stores one or more software modules. The slice instance management node 21 may implement the software module by using a processor and program code in the memory, to implement a slice instance management process.

In the following embodiments of the present application, to describe a method for instantiating the slice instance management node 21 and a slice instance management method that are provided in the present application more clearly, the following uses a logical function module as an execution body for description. A person skilled in the art can understand that during specific implementation, the logical function module needs to depend on a hardware resource of an entity device in which the logical function module is located.

In addition, in the embodiments of the present application, the slice instance management system 100 may be applied to a future 5th Generation (English: 5th-Generation, 5G for short) system or a Long Term Evolution (LTE) communications system, may be applied to an evolved LTE communications system such as an LTE-Advanced (English full name: long term evolution advanced) system, or may be applied to a 3rd generation mobile telecommunications (English: 3rd-Generation, 3G for short) system such as a WCDMA system, or the like. This is not limited in the present application.

Figure 6:
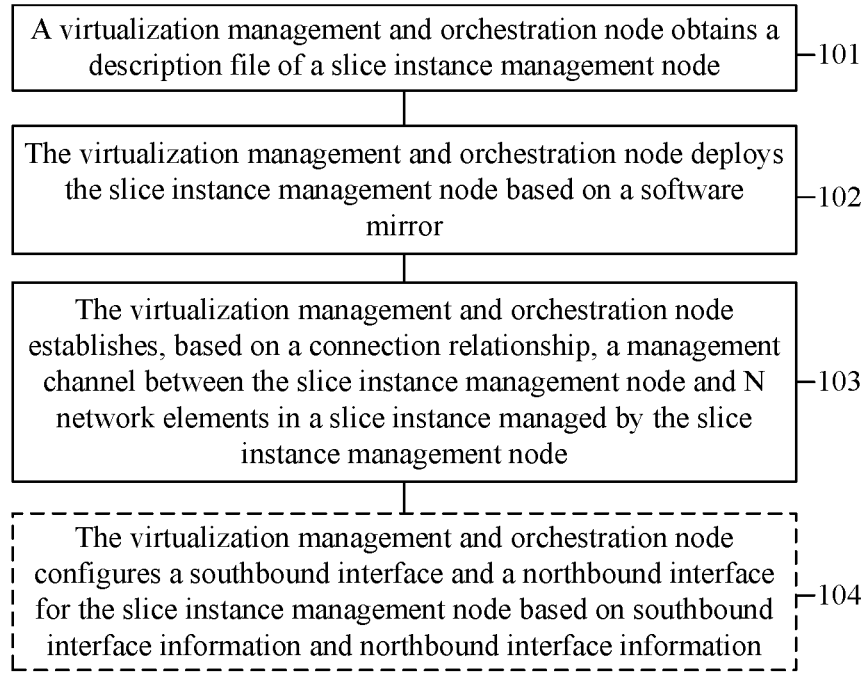
FIG. 6 is a schematic flowchart of a method for instantiating a slice instance management node according to an embodiment of the present application.

Based on the slice instance management system 100 shown in FIG. 2, an embodiment of the present application provides a method for instantiating the slice instance management node 21 in the following. As shown in FIG. 6, the method includes the following steps.

101. The virtualization management and orchestration node obtains a description file of the slice instance management node.

The operator system 22 usually defines different slice blueprints (blueprint) for different slice instances at a design stage before an instantiation operation is performed on a slice instance. In the slice blueprint, related parameter information of the slice instance is usually set. The related parameter information may be, for example, network topology information, function component information, interaction protocol information, performance indicator information, and/or hardware requirement information.

In this embodiment of the present application, in addition to the related parameter information of the slice instance, the slice blueprint may further define a connection relationship between the slice instance management node 21 and each network element in the slice instance, and management rights of the slice instance management node 21, for example, a scope of rights of a service operation to be performed by the slice instance management node 21 at a network resource layer, a network function layer, and/or a network control layer, and rights to collect running information of a service or network element.

Therefore, at a slice instantiation stage, the operator system 22 may generate a description file of the slice instance and a description file of the slice instance management node 21 based on the foregoing blueprint, and send these description files to the virtualization management and orchestration node 25, and the virtualization management and orchestration node 25 completes an instantiation operation on the slice instance and the slice instance management node 21.

The description file of the slice instance may specifically include at least one of an Network Service Descriptor (NSD), a Virtual Link Descriptor (VLD), and a Virtualized Network Function (VNF) Forwarding Graph Descriptor (VNFFGD) that are defined in Network Function Virtualization (NFV) standards.

The description file of the slice instance management node 21 may include a software mirror of the slice instance management node 21 and a connection relationship between the slice instance management node 21 and N (N≥1) network elements. The N network elements are network elements in the slice instance managed by the slice instance management node.

The description file of the slice instance management node 21 is a description file newly added in this embodiment of the present application. The software mirror of the slice instance management node 21 may be specifically a VNF Descriptor (VNFD) of the slice instance management node 21. The connection relationship between the slice instance management node 21 and the N network elements may be specifically a virtual link descriptor of a management channel between the slice instance management node 21 and the N network elements.

102. The virtualization management and orchestration node deploys the slice instance management node based on a software mirror.

103. The virtualization management and orchestration node establishes, based on a connection relationship, a management channel between the slice instance management node and N network elements in the slice instance managed by the slice instance management node.

Similar to an existing slice instance instantiation process, the virtualization management and orchestration node 25 may further allocate a resource to the slice instance on a virtualized infrastructure after receiving the description file of the slice instance, deploy each network element in the slice instance based on the description file of the slice instance, and then establish a connection between the network elements based on the description file of the slice instance, to complete the instantiation operation on the slice instance.

Different from the existing slice instance instantiation process, the virtualization management and orchestration node 25 may further allocate a resource to the slice instance management node 21 on the virtualized infrastructure after receiving the description file of the slice instance management node 21, install the software mirror of the slice instance management node 21 in the slice instance to deploy the slice instance management node 21, as described in step 102, and further establish the management channel between the slice instance management node 21 and the N network elements based on the connection relationship between the slice instance management node 21 and the N network elements, as described in step 103.

The description file of the slice instance management node 21 obtained in step 101 may further include southbound interface information and northbound interface information.

The northbound interface information includes an interface between the slice instance management node 21 and the operator system 22 and an interface between the slice instance management node 21 and the client system 23 and management rights of the operator system 22 for the slice instance and management rights of the client system 23 for the slice instance. The southbound interface information includes an interface between the slice instance management node 21 and each network element in the slice instance.

For example, the northbound interface information may be specifically a configuration description of a northbound interface between the slice instance management node 21 and the operator system 22 and a configuration description of a northbound interface between the slice instance management node 21 and the client system 23. The configuration descriptions define the management rights of the operator system 22 for the slice instance and the management rights of the client system 23 for the slice instance. The southbound interface information may be specifically a configuration description of a southbound interface between the slice instance management node 21 and each network element.

In addition, the northbound interface between the client system 23 and the slice instance management node 21 may include a customized Application Programming Interface (API). APIs provided for different client systems 23 are not globally the same. Instead, the northbound interface information may be used to customize different APIs for the different client systems 23, to implement flexible management on the slice instance.

In this case, after steps 101 to 103 are performed, the virtualization management and orchestration node 25 may further perform the following step 104:

104. The virtualization management and orchestration node configures a southbound interface and a northbound interface for the slice instance management node based on southbound interface information and northbound interface information.

After the southbound interface and the northbound interface are configured for the slice instance management node 21, the slice instance management node 21 may communicate with each network element in the slice instance through the southbound interface, for example, collect running information such as a memory size of each network element during running. In addition, the slice instance management node 21 may separately communicate with the operator system and the client system through the northbound interface. The northbound interface between the slice instance management node 21 and the operator system may be the same as or different from the northbound interface between the slice instance management node 21 and the client system. This is not limited in this embodiment of the present application.

Further, when the virtualization management and orchestration node 25 configures the northbound interface for the slice instance management node 21 based on the northbound interface information, the management rights of the operator system 22 for the slice instance and the management rights of the client system 23 for the slice instance are configured. Therefore, during subsequent actual running of the slice instance, the slice instance management node 21 may complete management by the operator system 22 and the client system 23 on each network element in the slice instance, directly according to the configured management rights, without a need to additionally set complex control logic to determine whether a service request delivered by the operator system 22 or the client system 23 is appropriate. This reduces management complexity and load consumption in a slice instance management process.

In addition, in contrast to the prior art in which a slice management node needs to be deployed manually and a management policy in the slice management node needs to be configured, so as to implement management on each slice instance, in this embodiment of the present application, in a process of instantiating each slice instance, the slice instance management node 21 managing the slice instance can be automatically deployed based on a corresponding description file, and then, the slice instance management node 21 can automatically manage the slice instance belonging to the slice instance management node 21, according to management rights configured in the instantiation process. This implements an automatic slice instance management process and significantly reduces management costs and operation costs during slice instance management.

Alternatively, if the software mirror of the slice instance management node 21 has defined the southbound interface information and the northbound interface information for the slice instance management node 21, after step 102 (namely, deploying the slice instance management node 21 based on the software mirror) is performed, the deployed slice instance management node 21 already has the southbound interface and the northbound interface. In this case, step 104 does not need to be performed.

Until now, in the process in which the virtualization management and orchestration node 25 deploys the slice instance, the slice instance management node 21 is simultaneously deployed inside the slice instance, so that the instantiation operation on the slice instance management node 21 is completed.

Actions of the virtualization management and orchestration node 25 in steps 101 to 104 may be performed by the virtualization management and orchestration node 25 according to a corresponding software module in the memory mentioned in FIG. 5. This is not limited in this embodiment of the present application.

Further, based on the slice instance management system 100 shown in FIG. 2, after the slice instance management node 21 is instantiated, the slice instance management node 21 may manage the slice instance belonging to the slice instance management node 21.

Figure 7:
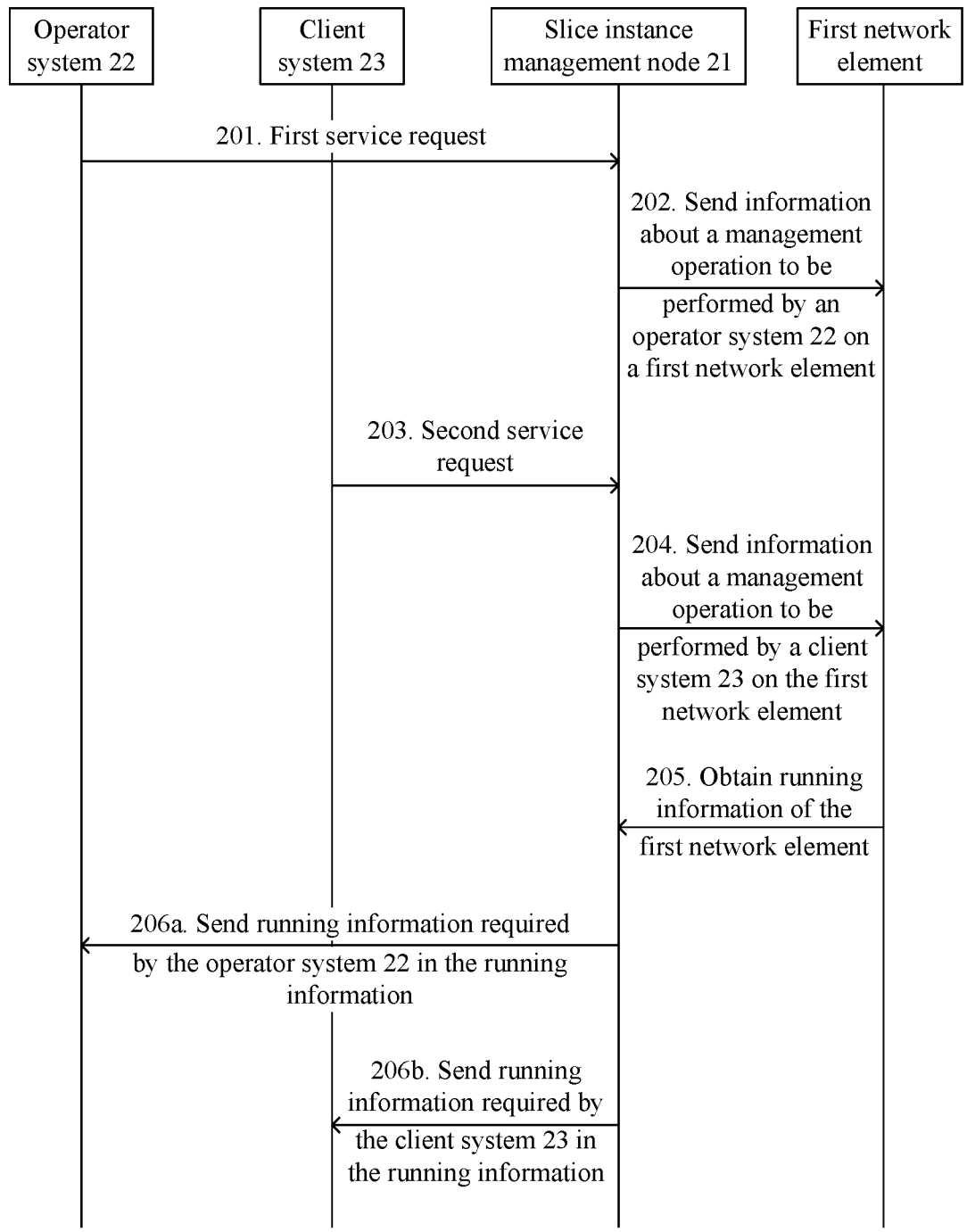
FIG. 7 is a schematic interaction diagram of a slice instance management method according to an embodiment of the present application.

Specifically, as shown in FIG. 7, FIG. 7 is a slice instance management method according to an embodiment of the present application. The method includes the following steps.

201. The slice instance management node 21 receives a first service request from the operator system 22, where the first service request includes information about a management operation to be performed by the operator system 22 on a first network element.

The first network element is a network element in a slice instance managed by the slice instance management node 21. Using the slice instance management system 100 shown in FIG. 2 as an example, the slice instance managed by the slice instance management node 21 is a slice instance in which the slice instance management node 21 is deployed, to be specific, the slice instance obtained after the instantiation operation is simultaneously performed on the slice instance management node 21 in steps 101 to 104.

Specifically, when the operator system 22 needs to perform corresponding management on the first network element in a slice instance, for example, a slice instance 1, the operator system 22 may send the first service request to the slice instance management node 21 that manages the slice instance 1. For example, the first service request may specifically request to perform a scale-out/scale-up operation on the first network element.

In this case, the first service request includes the information about the management operation to be performed by the operator system 22 on the first network element, to be specific, specific operation content for executing the first service request, for example, a specific scale-out/scale-up policy to be used when the scale-out/scale-up operation is performed on the first network element.

For example, the operator system 22 may send the first service request to the slice instance management node 21 through the northbound interface defined during instantiation of the slice instance management node 21 in step 104.

202. If the first service request is within first management rights, the instance management node 21 sends the information about the management operation to be performed by the operator system 22 on the first network element to the first network element.

The first management rights are management rights of the operator system 22 for the slice instance that are included in the description file of the instance management node 21.

During performing of step 104, the management rights of the operator system 22 for the slice instance are configured by using the northbound interface information. The management rights include the first management rights. For example, the first management rights may be specifically: allowing the operator system 22 to perform a scale-out/scale-up operation and a scale-in/scale-down operation on a network element 1 and a network element 2. A scale-out/scale-up size allowed during the scale-out/scale-up operation is not greater than 100 G (where 1 G=1024 MB, 1 MB=1024 KB, and 1 KB=1024 bytes).

Then, in step 202, if the first service request is within the first management rights, the instance management node 21 sends the information, in the first service request, about the management operation to be performed by the operator system 22 on the first network element to the first network element, and the first network element performs the corresponding operation based on the information about the management operation, for example, performs scale-out/scale-up according to the foregoing scale-out/scale-up policy.

It should be noted that because the northbound interface between the instance management node 21 and the operator system 22 may be different from the southbound interface between the instance management node 21 and the first network element, a protocol used when the instance management node 21 communicates with the operator system 22 may be different from a protocol used when the instance management node 21 communicates with the first network element. In this case, the instance management node 21 needs to perform corresponding parsing and conversion on the received first service request to convert the information, in the first service request, about the management operation to be performed by the operator system 22 on the first network element into a format that can be identified by the first network element, and send the converted information to the first network element.

Optionally, as shown in the following steps 203 and 204, the slice instance management node 21 may further perform a management operation on the slice instance according to a service request (to be specific, a second service request) sent by the client system 23.

It should be noted that a logical relationship between steps 203 and 204 and steps 201 and 202 is not limited in this embodiment of the present application. To be specific, steps 203 and 204 may be performed before or after steps 201 and 202 are performed, or the slice instance management node 21 may perform steps 203 and 204 and steps 201 and 202 simultaneously.

203. The slice instance management node 21 receives a second service request from the client system 23, where the second service request includes information about a management operation to be performed by the client system 23 on the first network element.

204. If the second service request is within second management rights, the instance management node 21 sends the information about the management operation to be performed by the client system 23 on the first network element to the first network element.

Similar to step 201, when the client system 23 needs to perform corresponding management on the first network element in a slice instance, for example, a slice instance 1, the client system 23 may send the second service request to the slice instance management node 21 that manages the slice instance 1. The second service request may be the same as or different from the first service request.

Similarly, the second service request includes the information about the management operation to be performed by the client system 23 on the first network element. The information about the management operation to be performed by the client system 23 on the first network element may be the same as or different from the information about the management operation to be performed by the operator system 22 on the first network element.

In addition, during performing of step 104, the management rights of the client system 23 for the slice instance management node 21 are also configured by using the southbound interface information. The management rights include the second management rights.

Then, in step 204, if the second service request is within the second management rights, the instance management node 21 sends the information, in the second service request, about the management operation to be performed by the client system 23 on the first network element to the first network element, and the first network element performs a corresponding operation based on the information about the management operation.

Optionally, as shown in the following steps 205 to 206b, the slice instance management node 21 further obtains, for the operator system 22 and/or the client system 23, running information of a related network element in the slice instance required by the operator system 22 and/or the client system 23. Similarly, a logical relationship between steps 205 to 206b, steps 203 and 204, and steps 201 and 202 is not limited in this embodiment of the present application.

205. The slice instance management node 21 obtains running information of the first network element according to third management rights.

The third management rights are included in the description file and are used to allow the slice instance management node 21 to obtain running information required by the operator system 22 and running information required by the client system 23.

In other words, during instantiation of the slice instance management node 21, running information of a network element that can be obtained by the slice instance management node 21 may be predefined in the description file, and the running information includes the running information required by the operator system 22 and the running information required by the client system 23. For example, the operator system 22 needs to learn of a CPU usage ratio and a memory usage ratio of the first network element during running, and the client system 23 needs to learn of the memory usage ratio of the first network element during running. Therefore, after the slice instance management node 21 is instantiated based on the description file, the slice instance management node 21 has the third management rights to obtain the foregoing running information, and then, at a running stage of the slice instance, the slice instance management node 21 may obtain, through the southbound interface according to the third management rights, the related running information of the first network element in the slice instance.

206a. The slice instance management node 21 sends, to the operator system 22 according to fourth management rights, running information required by the operator system 22 in the running information.

The fourth management rights are included in the description file and are used to allow the slice instance management node 21 to report the running information to the operator system 22.

Specifically, during performing of step 104, the management rights of the operator system 22 for the slice instance management node 21 are configured by using the southbound interface information. The management rights include the fourth management rights. For example, the fourth management rights may be specifically: allowing the operator system 22 to obtain the CPU usage ratio and the memory usage ratio of the first network element during running.

Then, in step 206a, the slice instance management node 21 may send, to the operator system 22 directly according to the fourth management rights, the running information required by the operator system 22 in the running information obtained in step 205.

206b. The slice instance management node 21 sends, to the client system 23 according to fifth management rights, running information required by the client system 23 in the running information.

The fifth management rights are included in the description file and are used to allow the slice instance management node 21 to report the running information to the client system 23.

Similarly, during performing of step 104, the management rights of the client system 23 for the slice instance management node 21 are configured by using the southbound interface information. The management rights include the fifth management rights. For example, the fifth management rights may be specifically: allowing the client system 23 to obtain the memory usage ratio of the first network element during running.

Then, in step 206b, the slice instance management node 21 may send, to the client system 23 directly according to the fifth management rights, the running information required by the client system 23 in the running information obtained in step 205.

Subsequently, the operator system 22 and the client system 23 may determine a running status of the slice instance based on the obtained running information, and further perform a corresponding management operation on the slice instance. For example, the operator system 22 delivers the first service request described in step 201 to the slice instance management node 21 and the client system 23 delivers the second service request described in step 203 to the slice instance management node 21, to ensure normal running of services in the slice instance.

It can be understood that the foregoing embodiment is merely described by using an example in which the slice instance management node 21 manages the first network element. A method for managing another network element in the slice instance by the slice instance management node 21 is similar to the method for managing the first network element by the slice instance management node 21, and details are not described herein again.

In addition, actions of the slice instance management node 21 in steps 201 to 206*b* may be performed by the slice instance management node 21 according to a corresponding software module in the memory mentioned in FIG. 5. This is not limited in this embodiment of the present application.

To sum up, this embodiment of the present application provides the slice instance management method. The slice instance management node is introduced to manage the slice instance in place of a conventional slice management node. The management rights of the operator system for the slice instance and the management rights of the client system for the slice instance are configured in the slice instance management node in a process of instantiating the slice instance management node. Therefore, the slice instance management node may manage each network element in the slice instance directly according to the configured management rights during running of the slice instance, without a need to additionally set complex control logic to determine whether the service request delivered by the operator system or the client system is appropriate. This ensures isolation between different slice instances, and also reduces management complexity and load consumption in a slice instance management process.

The foregoing describes the solutions provided in the embodiments of the present application, mainly from a perspective of interaction between network elements. It can be understood that to implement the foregoing functions, the virtualization management and orchestration node 25, the slice instance management node 21, and the like include a corresponding hardware structure and/or software module for performing each of the functions. A person skilled in the art should be easily aware that units and algorithms steps in the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present application, the virtualization management and orchestration node 25, the slice instance management node 21, and the like may be divided into functional modules according to the foregoing method example. For example, each functional module may be corresponding to one function, or two or more functions may be integrated into one processing module. The integrated module may be implemented in a form of hardware, or may be implemented in a form of a software functional module. It should be noted that the module division in the embodiments of the present application is an example, and is merely logical function division and may be other division during actual implementation.

Figure 8:
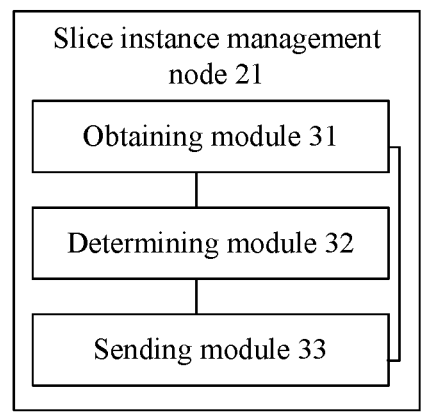
FIG. 8 is a schematic structural diagram 1 of a slice instance management node according to an embodiment of the present application.

For a case in which each functional module is corresponding to one function, FIG. 8 is a possible schematic structural diagram of the slice instance management node 21 in the foregoing embodiments. The slice instance management node 21 may be a possible design scheme of the slice instance management node 21 shown in FIG. 2 to FIG. 4.

Specifically, the slice instance management node 21 includes an obtaining module 31, a determining module 32, and a sending module 33.

The obtaining module 31 is configured to receive a first service request from an operator system, where the first service request includes information about a management operation to be performed by the operator system on a first network element, and the first network element is a network element in a slice instance managed by the slice instance management node.

The determining module 32 is configured to determine whether the first service request is within first management rights, where the first management rights are management rights of the operator system for the slice instance that are included in a description file of the instance management node.

The sending module 33 is configured to: if the first service request is within the first management rights, send the information about the management operation to be performed by the operator system on the first network element to the first network element.

Further, the obtaining module 31 is further configured to receive a second service request from a client system, where the second service request includes information about a management operation to be performed by the client system on the first network element.

The determining module 32 is further configured to determine whether the second service request is within second management rights, where the second management rights are management rights of the client system for the slice instance that are included in the description file.

The sending module 33 is further configured to: if the second service request is within the second management rights, send the information about the management operation to be performed by the client system on the first network element to the first network element.

Further, the obtaining module 31 is further configured to obtain running information of the first network element according to third management rights, where the third management rights are included in the description file and are used to allow the slice instance management node to obtain running information required by the operator system and running information required by the client system.

The sending module 33 is further configured to send, to the operator system according to fourth management rights, the running information required by the operator system in the running information, where the fourth management rights are included in the description file and are used to allow the slice instance management node to report the running information to the operator system.

Further, the sending module 33 is further configured to send, to the client system according to fifth management rights, the running information required by the client system in the running information, where the fifth management rights are included in the description file and are used to allow the slice instance management node to report the running information to the client system.

All related content of the steps related to the foregoing method embodiments may be cited in function descriptions of corresponding functional modules. Details are not described herein again.

Figure 9:
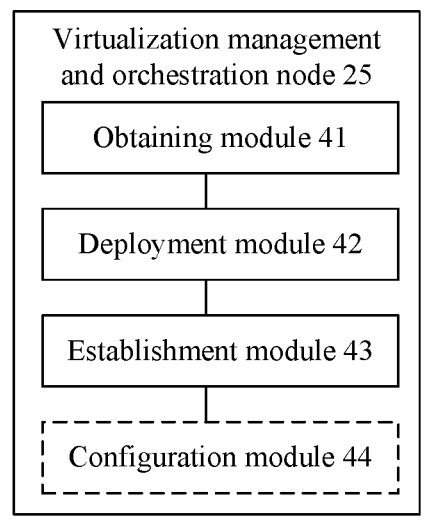
FIG. 9 is a schematic structural diagram 1 of a virtualization management and orchestration node according to an embodiment of the present application.

For a case in which each functional module is corresponding to one function, FIG. 9 is a possible schematic structural diagram of the virtualization management and orchestration node 25 in the foregoing embodiments. The virtualization management and orchestration node 25 may be a possible design scheme of the virtualization management and orchestration node 25 shown in FIG. 2 to FIG. 4.

Specifically, the virtualization management and orchestration node 25 includes an obtaining module 41, a deployment module 42, and an establishment module 43.

The obtaining module 41 is configured to obtain a description file of a slice instance management node, where the description file includes a software mirror of the slice instance management node and a connection relationship between the slice instance management node and N network elements, where the N network elements are network elements that are in a slice instance and that are managed by the slice instance management node, and N≥1.

The deployment module 42 is configured to deploy the slice instance management node based on the software mirror.

The establishment module 43 is configured to establish a management channel between the slice instance management node and the N network elements based on the connection relationship.

Further, as shown in FIG. 9, the virtualization management and orchestration node 25 may further include:

a configuration module 44, configured to configure a southbound interface and a northbound interface for the slice instance management node based on southbound interface information and northbound interface information.

All related content of the steps related to the foregoing method embodiments may be cited in function descriptions of corresponding functional modules. Details are not described herein again.

Figure 10:
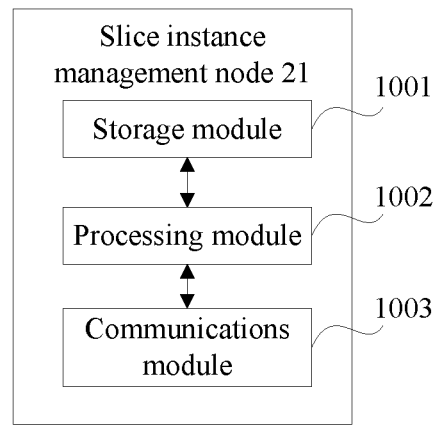
FIG. 10 is a schematic structural diagram 2 of a slice instance management node according to an embodiment of the present application.

For a case in which an integrated unit is used, FIG. 10 is a possible schematic structural diagram of the slice instance management node 21 in the foregoing embodiments. The slice instance management node 21 includes a processing module 1002 and a communications module 1003. The processing module 1002 is configured to perform control management on actions of the slice instance management node 21. For example, the processing module 1002 is configured to support the slice instance management node 21 in performing a process of steps 201 to 206b in FIG. 7 and/or is used for other processes of the technology described in the specification. The communications module 1003 is configured to support communication between the slice instance management node 21 and another network entity, for example, communication between the slice instance management node 21 and a functional module or a network entity shown in FIG. 2 to FIG. 4. The slice instance management node 21 may further include a storage module 1001, configured to store program code and data of the slice instance management node 21.

Figure 11:
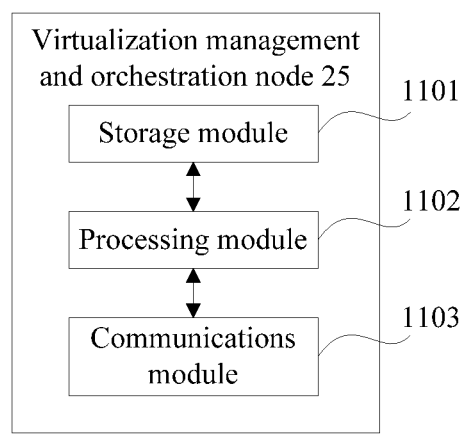
FIG. 11 is a schematic structural diagram 2 of a virtualization management and orchestration node according to an embodiment of the present application.

Similarly, for a case in which an integrated unit is used, FIG. 11 is a possible schematic structural diagram of the virtualization management and orchestration node 25 in the foregoing embodiments. The virtualization management and orchestration node 25 includes a processing module 1102 and a communications module 1103. The processing module 1102 is configured to perform control management on actions of the virtualization management and orchestration node 25. For example, the processing module 1102 is configured to support the virtualization management and orchestration node 25 in performing a process of steps 101 to 104 in FIG. 6 and/or is used for other processes of the technology described in the specification. The communications module 1103 is configured to support communication between the virtualization management and orchestration node 25 and another network entity, for example, communication between the virtualization management and orchestration node 25 and a functional module or a network entity shown in FIG. 2 to FIG. 4. The virtualization management and orchestration node 25 may further include a storage module 1101, configured to store program code and data of the virtualization management and orchestration node 25.

The processing module 1002/1102 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor/controller may implement or execute various example logical blocks, modules, and circuits described with reference to content disclosed in the present application. Alternatively, the processor may be a combination for implementing a computing function, for example, a combination of one or more microprocessors, or a combination of a DSP and a microprocessor. The communications module 1003/1103 may be a transceiver, a transceiver circuit, a communications interface, or the like. The storage module 1001/1101 may be a memory.

When the processing module 1002/1102 is a processor, the communications module 1003/1103 is a communications interface, and the storage module 1001/1101 is a memory, the slice instance management node 21 or the virtualization management and orchestration node 25 in the embodiments of the present application may be the computer device 200 shown in FIG. 5.

A person skilled in the art should be aware that in the foregoing one or more examples, the functions described in the present application may be implemented by hardware, software, firmware, or any combination thereof. When the functions are implemented by software, the functions may be stored in a computer-readable medium, or transmitted as one or more instructions or code in a computer-readable medium. The computer-readable medium includes a non-transitory computer-readable storage medium and a communications medium. The communications medium includes any medium that allows a computer program to be easily transmitted from one place to another. The non-transitory computer-readable storage medium may be any available medium accessible to a general-purpose or special-purpose computer.

The objectives, technical solutions, and beneficial effects of the present application are further described in detail in the foregoing specific implementations. It should be understood that the foregoing descriptions are merely specific implementations of the present application, but are not intended to limit the protection scope of the present application. Any modification, equivalent replacement, or improvement made based on the technical solutions of the present application shall fall within the protection scope of the present application.

What is claimed is:

1. A method of slice management, comprising:

receiving, by a slice instance management node from an operator system, a first service request comprising information about a management operation to be performed by the operator system on a first network element, the first network element being in a slice instance managed by the slice instance management node;

in response to the first service request being within first management rights, sending, by the slice instance management node, the information about the management operation to be performed by the operator system on the first network element to the first network element, the first management rights comprising management rights of the operator system for the slice instance that are contained in a description file of the slice instance management node;

receiving, by the slice instance management node from a client system, a second service request comprising information about a management operation to be performed by the client system on the first network element; and in response to the second service request being within second management rights, sending, by the slice instance management node, the information about the management operation to be performed by the client system on the first network element to the first network element, the second management rights being management rights of the client system for the slice instance that are contained in the description file, and the second management rights comprising management rights of the client system for the slice instance being different than the first management rights comprising management rights of the operator system for the slice instance.

2. The method according to claim 1, wherein the method further comprises:

obtaining, by the slice instance management node, running information of the first network element according to third management rights, the third management rights being contained in the description file and used to allow the slice instance management node to obtain running information required by the operator system and running information required by the client system; and sending, by the slice instance management node to the operator system according to fourth management rights, the running information required by the operator system in the running information of the first network element, the fourth management rights being contained in the description file and used to allow the slice instance management node to report the running information required by the operator system to the operator system.

3. The method according to claim 2, wherein after the obtaining, by the slice instance management node, the running information of the first network element according to the third management rights, the method further comprises:

sending, by the slice instance management node to the client system according to fifth management rights, the running information required by the client system in the running information of the first network element, the fifth management rights being contained in the description file and used to allow the slice instance management node to report the running information required by the client system to the client system.

4. The method according to claim 1, wherein before the receiving, by the slice instance management node, the first service request from the operator system, the method further comprises:

obtaining, by a virtualization management and orchestration node, the description file of the slice instance management node, the description file comprising a software mirror of the slice instance management node and a connection relationship between the slice instance management node and N network elements in the slice instance, and N≥1;

deploying, by the virtualization management and orchestration node, the slice instance management node based on the software mirror; and establishing, by the virtualization management and orchestration node, a management channel between the slice instance management node and the N network elements based on the connection relationship.

5. The method according to claim 4, wherein the description file further comprises northbound interface information and southbound interface information; the northbound interface information comprises an interface connected to the operator system and an interface connected to the client system, and the management rights of the operator system for the slice instance and the management rights of the client system for the slice instance; and the southbound interface information comprises an interface connected to each network element in the slice instance, and after the establishing, by the virtualization management and orchestration node, the management channel between the slice instance management node and the N network elements based on the connection relationship, the method further comprises:

configuring, by the virtualization management and orchestration node, a southbound interface and a northbound interface for the slice instance management node based on the southbound interface information and the northbound interface information.

6. The method according to claim 1, wherein the slice instance management node is deployed in the slice instance.

7. The method according to claim 1, wherein the slice instance management node is deployed in the operator system.

8. The method according to claim 1, wherein the slice instance management node is deployed outside the slice instance and the operator system.

9. A slice instance management node, comprising:

at least one processor; and a non-transitory computer readable storage medium having a plurality of computer readable instructions stored thereon that, when executed by the at least one processor, cause the slice instance management node to:

receive from an operator system a first service request comprising information about a management operation to be performed by the operator system on a first network element, wherein the first network element is a in a slice instance managed by the slice instance management node;

determine whether the first service request is within first management rights comprising management rights of the operator system for the slice instance that are contained in a description file of the slice instance management node;

in response to the first service request being within the first management rights, send the information about the management operation to be performed by the operator system on the first network element to the first network element;

receive from a client system a second service request comprising information about a management operation to be performed by the client system on the first network element;

determine whether the second service request is within second management rights comprising management rights of the client system for the slice instance that are contained in the description file; and in response to the second service request being within the second management rights, send the information about the management operation to be performed by the client system on the first network element to the first network element, wherein the second management rights comprising management rights of the client system for the slice instance are different than the first management rights comprising management rights of the operator system for the slice instance.

10. The slice instance management node according to claim 9, wherein the computer readable instructions when further executed by the at least one processor, cause the slice instance management node to:
  obtain running information of the first network element according to third management rights contained in the description file and used to allow the slice instance management node to obtain running information required by the operator system and running information required by the client system; and
  send, to the operator system according to fourth management rights, the running information required by the operator system in the running information of the first network element, wherein the fourth management rights are contained in the description file and are used to allow the slice instance management node to report the running information required by the operator system to the operator system.

11. The slice instance management node according to claim 10, wherein the computer readable instructions when further executed by the at least one processor, cause the slice instance management node to:
  send, to the client system according to fifth management rights, the running information required by the client system in the running information of the first network element, wherein the fifth management rights are contained in the description file and are used to allow the slice instance management node to report the running information required by the client system to the client system.

12. The slice instance management node according to claim 9, wherein the slice instance management node is deployed in the slice instance.

13. The slice instance management node according to claim 9, wherein the slice instance management node is deployed in the operator system.

14. The slice instance management node according to claim 9, wherein the slice instance management node is deployed outside the slice instance and the operator system.

15. A method comprising:
  obtaining, by a virtualization management and orchestration node, a description file of a slice instance management node, the description file comprising a software mirror of the slice instance management node and a connection relationship between the slice instance management node and N network elements in a slice instance managed by the slice instance management node, and N≥1;
  deploying, by the virtualization management and orchestration node, the slice instance management node based on the software mirror;
  establishing, by the virtualization management and orchestration node, a management channel between the slice instance management node and the N network elements based on the connection relationship;
  receiving, by the slice instance management node from an operator system, a first service request comprising information about a management operation to be performed by the operator system on a first network element of the N network elements, the first network element comprising a network element in the slice instance managed by the slice instance management node; and
  in response to the first service request being within first management rights, sending, by the slice instance management node, the information about the management operation to be performed by the operator system on the first network element to the first network element, the first management rights comprising management rights of the operator system for the slice instance that are contained in the description file of the slice instance management node.

16. The method according to claim 15, wherein the description file further comprises northbound interface information and southbound interface information; the northbound interface information comprises an interface connected to the operator system and an interface connected to a client system, and the management rights of the operator system for the slice instance and the management rights of the client system for the slice instance; and the southbound interface information comprises an interface connected to each network element in the slice instance, and
  after the establishing, by the virtualization management and orchestration node, the management channel between the slice instance management node and the N network elements based on the connection relationship, the method further comprises:
    configuring, by the virtualization management and orchestration node, a southbound interface and a northbound interface for the slice instance management node based on the southbound interface information and the northbound interface information.

17. The method according to claim 15, wherein the method further comprises:
  obtaining, by the slice instance management node, running information of the first network element according to third management rights, the third management rights being contained in the description file and used to allow the slice instance management node to obtain running information required by the operator system and running information required by a client system; and
  sending, by the slice instance management node to the operator system according to fourth management rights, the running information required by the operator system in the running information of the first network element, the fourth management rights being contained in the description file and used to allow the slice instance management node to report the running information required by the operator system to the operator system.

18. The method according to claim 17, wherein after the obtaining, by the slice instance management node, the running information of the first network element according to the third management rights, the method further comprises:
  sending, by the slice instance management node to the client system according to fifth management rights, the running information required by the client system in the running information of the first network element, the fifth management rights being contained in the description file and used to allow the slice instance management node to report the running information required by the client system to the client system.

19. The method according to claim 15, wherein the slice instance management node is deployed in the slice instance.

20. The method according to claim 15, wherein the slice instance management node is deployed in the operator system.

* * * * *

UNITED STATES PATENT AND TRADEMARK OFFICE
CERTIFICATE OF CORRECTION

PATENT NO. : 10,819,592 B2
APPLICATION NO. : 16/385419
DATED : October 27, 2020
INVENTOR(S) : Zhuoming Li Page 1 of 1

It is certified that error appears in the above-identified patent and that said Letters Patent is hereby corrected as shown below:

In the Claims

In Column 22, Line 38, Claim 9, delete "is a in a slice" and insert --is in a slice--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*